Z. P. CANDEE.
MACHINE ELEMENT.
APPLICATION FILED APR. 15, 1920.
1,393,610.
Patented Oct. 11, 1921.
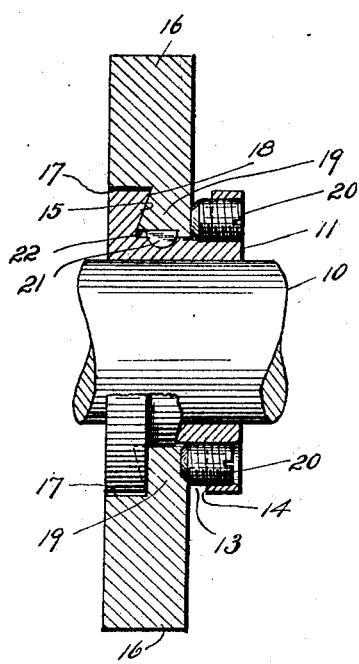
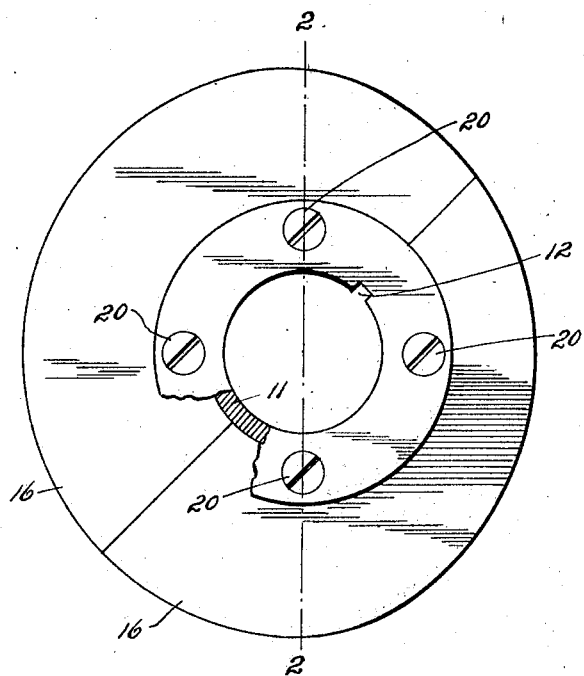

UNITED STATES PATENT OFFICE.

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

MACHINE ELEMENT.

1,393,610.  Specification of Letters Patent.  Patented Oct. 11, 1921.

Application filed April 15, 1920. Serial No. 374,149.

*To all whom it may concern:*

Be it known that I, ZENAS P. CANDEE, a citizen of the United States, residing at Waterbury, in the county of New Haven and State of Connecticut, have invented certain new and useful Improvements in Machine Elements, of which the following is a specification, reference being had therein to the accompanying drawings.

This invention relates to a new and improved machine element, having particular reference to the design and construction of a cam, eccentric, pulley, gear or the like for use in quarters where the usual means for assembling are not practicable, or where the same are of such size as to make it desirable that they be produced in parts.

To these, and other, ends my invention consists in the machine element having certain details of construction and combination of parts as will be hereinafter described and more fully pointed out in the claims.

In the drawings wherein like numerals of reference designate like parts in both figures.

Figure 1 is a fragmentary side view of my improved mechanism and

Fig. 2 is a sectional view thereof taken upon line 2—2 of Fig. 1.

In certain classes of machines, especially those of considerable size and proportion and those wherein the shafts are of unusual length are difficult of assembly, or by reason of the proximity of adjacent parts that require dismantling for the purpose of assembly, the ordinary method of constructing and assembling gears, cams, pulleys, eccentrics and the like makes the use thereof impracticable and consequently the design of the machine is altered to provide therefor, and many times to the detriment of the machine itself, both as to strength and simplicity.

To overcome these and other objections common in the art of machine design and construction, I have provided a mechanism wherein a gear, cam, eccentric, pulley or the like may be constructed and assembled so as to perform all of its required functions and without sacrificing strength and will overcome all of the objections heretofore met in the assembling thereof, even though the quarters may be cramped or the mechanism extremely ponderous.

In the drawings the numeral 10 designates a fragment of a shaft upon which is secured a hub 11, preferably but not necessarily by a key 12.

This hub 11 is constructed with an annular groove 13 in its periphery one wall 14 being at substantially a right angle to the axis thereof and the opposite wall 15 being at an angle thereto. This latter wall provides an undercut face and thereby the groove 13 is wider at its bottom than at the top. The gear, pulley, eccentric or the like is preferably constructed in sections. The drawings herein illustrate a cam, as an illustration of one form of such element, made in two sections 16—16 which are each provided with a semi-circular groove 17 in one side having an angular face 18 with the same angle of inclination as that of the wall 15 on the hub 11.

The mechanism is assembled by placing the sections 16—16 around the hub 11, with the portions 19 thereof projecting into the groove 13 and then the same are moved laterally so that the faces 15 and 18 contact with each other, the sections being there held against either lateral or rotary movement in relation to the hub by the screws 20. When so assembled all of the parts constitute substantially a single unitary structure.

If the torsional strain is great, the screws 20 may be spotted into the sections 16, as shown by the screws 20, at the lower part of Fig. 2, or the sections may be keyed to the hub, if desired by keys 21, these latter being set in the hub 11 and projecting upwardly into a spline 22 in the sections 16. The key enters the spline during the lateral movement of the section within the groove 13.

By this structure the hub 11 is mounted on the shaft 10 when the machine is first assembled and there is no occasion for removing the same thereafter. The sections 16 are thereafter assembled thereon or dismantled therefrom at pleasure and without moving the shaft or disturbing adjacent mechanism or parts.

Within a certain range the details of this invention may be altered and I would therefore have it understood that I do not limit myself to the exact construction herein shown and described but claim all that falls fairly within the spirit and scope of the appended claims.

Having described my invention what I claim as new and desire to secure by Letters Patent, is:

1. Mechanism of the character described, having a central member; a plurality of sections grouped together and around said central member, means for holding said sections in a fixed relation to said central member against centrifugal force, means for holding said sections against lateral movement relative to said central member, and means independent of said sections for securing said central member.

2. Mechanism of the character described, composed of a plurality of parts, one of said parts being a central member, and the other parts being associated with each other, and having an interlocking engagement with said central member; means for securing said latter parts against movement relative to said central member, and means independent of said parts for securing said central member.

3. Mechanism of the character described, having a central member; a plurality of sections grouped together and around said central member, means for holding said sections in a fixed relation to said central member against centrifugal force, and independent means for holding said sections against lateral movement relative to said central member.

4. Mechanism of the character described, having a central member, with a peripheral groove; a plurality of sections grouped together and around said central member within said groove, and means for holding said sections in a fixed relation to each other and said central member within said groove said means comprising in part a member that by lateral contact prevents centrifugal release of said sections.

5. Mechanism of the character described, having a central member, with a peripheral groove; one wall of which is undercut; a plurality of sections grouped together and around said central member, each of said sections having an undercut recess in one side thereof, which recesses coact with the undercut wall of said groove to hold said sections against relative outward movement; and means for holding said sections against lateral movement in said groove.

6. Mechcanism of the character described wherein there are a plurality of assembled parts, one of which is central to the others and designed to be fixed to a moving element, the others being so shaped as to have an interlocking engagement with said central member and when grouped together and with said central member form a single machine element operating as a unit, and means for associating all of said parts together that they are held in their proper relations to each other against lateral or outward movement, the means for fixing said central member to the moving element, being independent of any of said plurality of parts assembled with the central part.

7. Mechanism of the character described composed of a central member, having a peripheral groove wider at the bottom than at the top; of a plurality of sections, each of which is no wider near its central portion than the narrowest part of said groove; and means for holding said sections against relative movement within said groove.

8. Mechanism of the character described composed of a central member having a peripheral groove; of a plurality of sections, each having a recess, which combined with the recess of adjoining sections form an annular recess, one wall of the said peripheral groove and one face of said recess being formed so as said sections will have an interlocking engagement with said central member when grouped together; and means for holding said sections against relative movement with said central member.

In testimony whereof, I have hereunto affixed my signature.

ZENAS P. CANDEE.